(12) United States Patent
Sinha et al.

(10) Patent No.: US 9,198,034 B2
(45) Date of Patent: Nov. 24, 2015

(54) VALIDATING PRESENCE OF A COMMUNICATION DEVICE USING A WIRELESS LOCAL AREA NETWORK

(71) Applicant: Motorola Solutions, Inc., Schaumburg, IL (US)

(72) Inventors: Rahul Sinha, Bangalore (IN); Ramesh Balla, Bangalore (IN)

(73) Assignee: Symbol Technologies, LLC, Holtsville, NY (US)

( * ) Notice: Subject to any disclaimer, the term of this patent is extended or adjusted under 35 U.S.C. 154(b) by 245 days.

(21) Appl. No.: 13/929,891

(22) Filed: Jun. 28, 2013

(65) Prior Publication Data

US 2015/0003433 A1    Jan. 1, 2015

(51) Int. Cl.

| | |
|---|---|
| *H04L 9/00* | (2006.01) |
| *H04W 12/04* | (2009.01) |
| *H04W 84/12* | (2009.01) |
| *H04L 29/06* | (2006.01) |
| *H04W 12/06* | (2009.01) |
| *H04W 64/00* | (2009.01) |
| *H04W 4/02* | (2009.01) |

(52) U.S. Cl.
CPC ............. *H04W 12/04* (2013.01); *H04L 63/107* (2013.01); *H04L 63/18* (2013.01); *H04W 4/023* (2013.01); *H04W 12/06* (2013.01); *H04W 64/003* (2013.01); *H04W 84/12* (2013.01)

(58) Field of Classification Search
CPC ............................... H04W 12/04; H04W 84/12
USPC .......................................................... 370/338
See application file for complete search history.

(56) References Cited

U.S. PATENT DOCUMENTS

| | | | |
|---|---|---|---|
| 2003/0027577 A1 | 2/2003 | Brown et al. | |
| 2004/0143691 A1* | 7/2004 | Brown et al. .................. | 710/110 |
| 2006/0019679 A1* | 1/2006 | Rappaport et al. .......... | 455/456.5 |
| 2007/0133487 A1 | 6/2007 | Wang et al. | |

(Continued)

FOREIGN PATENT DOCUMENTS

| | | |
|---|---|---|
| WO | 2006012554 A2 | 2/2006 |
| WO | 2012001366 A2 | 1/2012 |

OTHER PUBLICATIONS

Bankiukevic et al.; "Improving Wi-FI Based Indoor Positioning Using Bluetooth Add-Ons"; Jun. 6-9, 2011.

(Continued)

*Primary Examiner* — Edan Orgad
*Assistant Examiner* — Sithu Ko

(57) ABSTRACT

A method and system for validating presence of a communication device in a confined area using a wireless local area network (WLAN) includes sending a first handshake message including a generated first key over a second network connection different from the WLAN connection by a device. A next step includes generating a second key to be returned to the device in a second handshake message over the same connection. A next step includes sending a WLAN probe request that has been modified to include the second key via the WLAN. A next step includes validating whether the device is present within the confined area using a second communication network; whereafter allowing communication access over the second network using both the first and second keys if the device is validated as being present within the confined area, and taking appropriate action if the device is not validated as being present within the confined area.

17 Claims, 5 Drawing Sheets

(56) References Cited

U.S. PATENT DOCUMENTS

| | | |
|---|---|---|
| 2007/0186105 A1 | 8/2007 | Bailey et al. |
| 2007/0234054 A1* | 10/2007 | Robert et al. ................. 713/170 |
| 2008/0176583 A1 | 7/2008 | Brachet et al. |
| 2008/0268875 A1 | 10/2008 | Holland et al. |
| 2009/0293016 A1 | 11/2009 | Potevin et al. |
| 2010/0024017 A1 | 1/2010 | Ashfield et al. |
| 2010/0205316 A1* | 8/2010 | Xue et al. ...................... 709/229 |
| 2011/0029359 A1 | 2/2011 | Roeding et al. |
| 2012/0115510 A1 | 5/2012 | Denby et al. |
| 2013/0304879 A1* | 11/2013 | Schmidt ........................ 709/220 |
| 2014/0019759 A1* | 1/2014 | Burmester et al. ............ 713/172 |

OTHER PUBLICATIONS

Gonzalez-Tablas Ferreres A I et al, "Guarenteeing the Authenticity of Location Information". IEEE Pervasive Computing, IEEE Service Center, Los Alamitos, CA, US, vol. 7, No. 3, Jan. 7, 2008, p. 72-80.

International Search Report and Written Opinion mailed Sep. 15, 2014 in counterpart PCT application No. PCT/US2014/043576.

* cited by examiner

VALIDATING PRESENCE OF A COMMUNICATION DEVICE USING A WIRELESS LOCAL AREA NETWORK

BACKGROUND

Radio frequency based solutions have been introduced that deploy, low-cost radio frequency based tags at known, mapped locations within confined premises, such as a floor of a retail store. Such tags can include radio frequency identification (RFID) tags, Bluetooth™ Low Energy (BLE) tags, and the like, that periodically broadcast a beacon that includes each tag's unique identity. A client device, e.g. a smartphone running a locationing application, moving within the premises, and having the ability to receive the beacon and read the identity of any one (i.e. the strongest signaled) of such tags, can then be associated with that tag's location. The client device or other network device can provide this identity information to a server in a location update message, such that the server will then have known the location of the client device by referring the known location of the identified tag. This location data can be collected by the server over a time period to be used by an analytics engine to derive meaningful results, e.g. a substantial number of customers congregate at a tag location of a particular product of interest. The correctness of these collected results lies in the integrity of the location data collected by the server.

However, a problem arises from radio frequency based tag locationing, in that these simple, low-cost tags do not have much intelligence, and there is no encryption or any authorization involved with their use. As a result, there could be an opportunity for hackers to create security attacks for such solutions where client software is running on unmanaged/uncontrolled devices. Such an attack could corrupt the server database with spurious information. For example, an attacker could sniff the beacon packets, determine the format of the packet, and determine the deployed tag's identification. All that would be required for this is for the attacker to walk around the floor with a sniffer device and listen for beacons. The attacker could then create a fraudulent packet with a random list of beacons with known tag identifications, and send these fraudulent packets in a location update message to the server.

If the malicious device is operating on a wireless local area network (WLAN) when it sends these fraudulent packets, the server could be able to confirm a location of the malicious device using various locationing-over-WLAN techniques known in the art, such as Time Delay of Arrival or Radio Signal Strength Indicators, on the WLAN communication signals from the device to triangulate its location. However, if the malicious device is communicating with the server over a cellular network, for example, the device could have no physical presence on the premises and the server would have no way to determine the device location. Therefore, a hacker could simply walk into the premises with sniffer tool and collect all tag packets and identification. The hacker can also collect the packets on WLAN interface thereby correlating the tag with access point coverage areas in the region where the tags are installed. Since tag packets are not encrypted, the hacker can set up one or more malicious devices to mimic the tag packets in location update messages sent to the server over the cellular network. In this way, the hacker can flood the server locationing database with incorrect location update messages.

The hacker above can easily ensure that the rate of arrival of location update messages neither qualifies for thrashing nor violates tag to access point coverage area correlation. (When the arrival rate of location update messages exceeds a known threshold rate, a process called thrashing is applied wherein the source of location update message is considered compromised and the location update messages from that source is thereby discarded.) The hacker can wield such attacks while being geographically remote using the cellular network. Also, the hacker can impersonate multiple customers (which can be done programmatically, and thereby not limited in count). Such attacks can be paid for, too. For instance, an unscrupulous employee responsible for boosting sales of a product can pay a hacker to mislead an analytics engine of a system server to conclude that significant interests have been expressed by the customers for that product. To do so the hacker needs to maximize location update messages for the tag placed next to that product. The hacker then can connect remotely to server over a cellular network and start sending location update messages from multiple devices, statistically lopsided in favor of the tag. As a result, the analytics engine of the server will be misled to conclude a surge in customer interest for that product.

In addition, the attacker could use different Media Access Control (MAC) addresses to give an impression that there are multiple clients reporting the location update messages. Further, the attacker could spoof the MAC addresses from other clients, which could result in more serious issues. In particular, a rogue client using a spoofed MAC address could send the incorrect tag identifications in location update messages so that the location server would think the client is located at a wrong location. Collecting these false location update messages by the server could result in many false positive readings, corrupting the information being collected by the server, thereby misleading the analytics engine to generate wrong results or to generate results that unduly favor a party.

Hence, there is a need for a technique to validate that location update messages are coming from a device that is present within the confined premises. In particular, it is desirable to determine that location update messages are coming from a device having a presence in the confined area.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
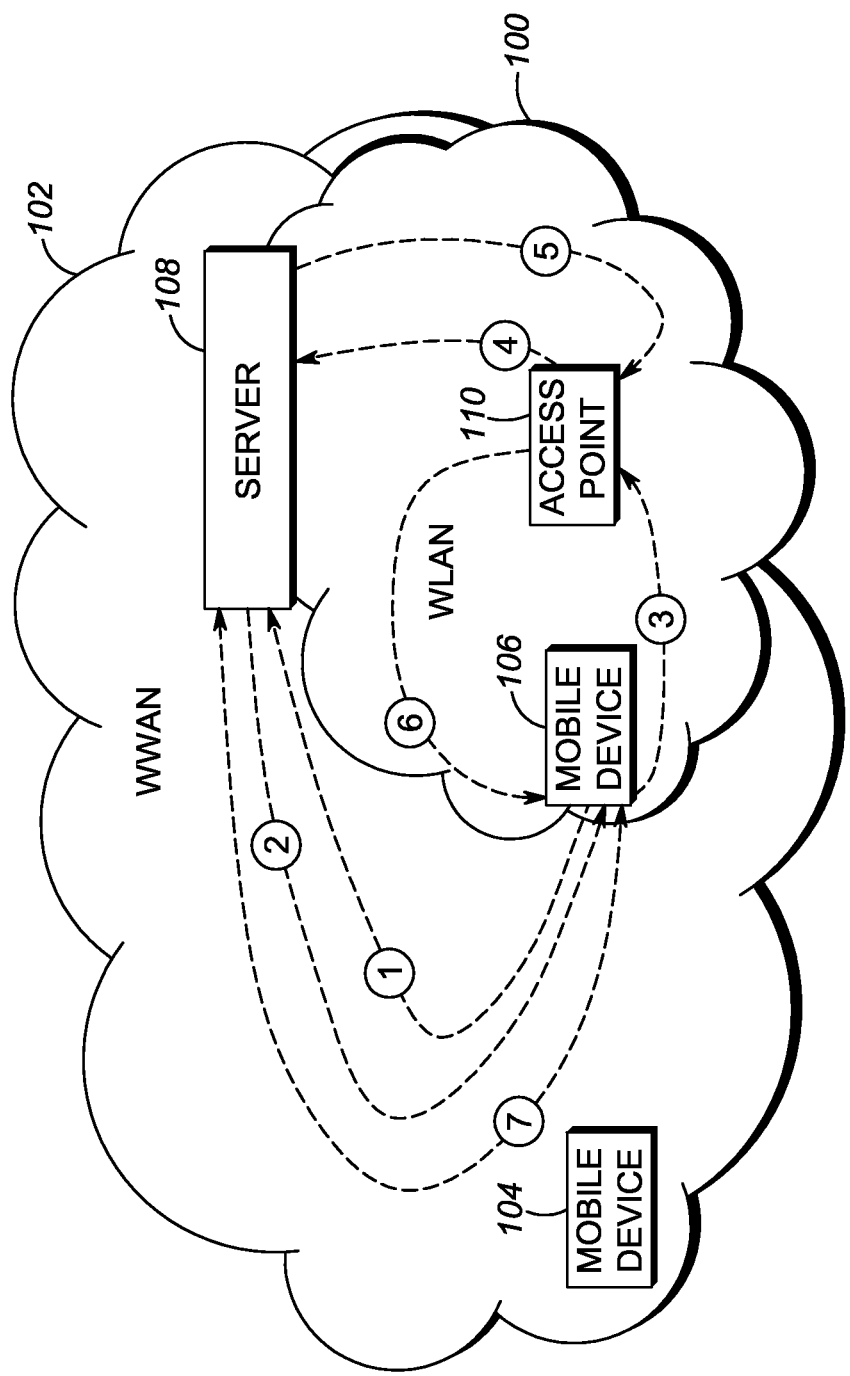
FIG. 1 is a simplified block diagram of a generic system, which needs to validate physical presence of a communication device, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a technique to validate that communications are coming from a device that is present within the confined premises. In particular, it is desirable to determine that communications being received are coming from a device having a presence in the confined area.

Figure 2:
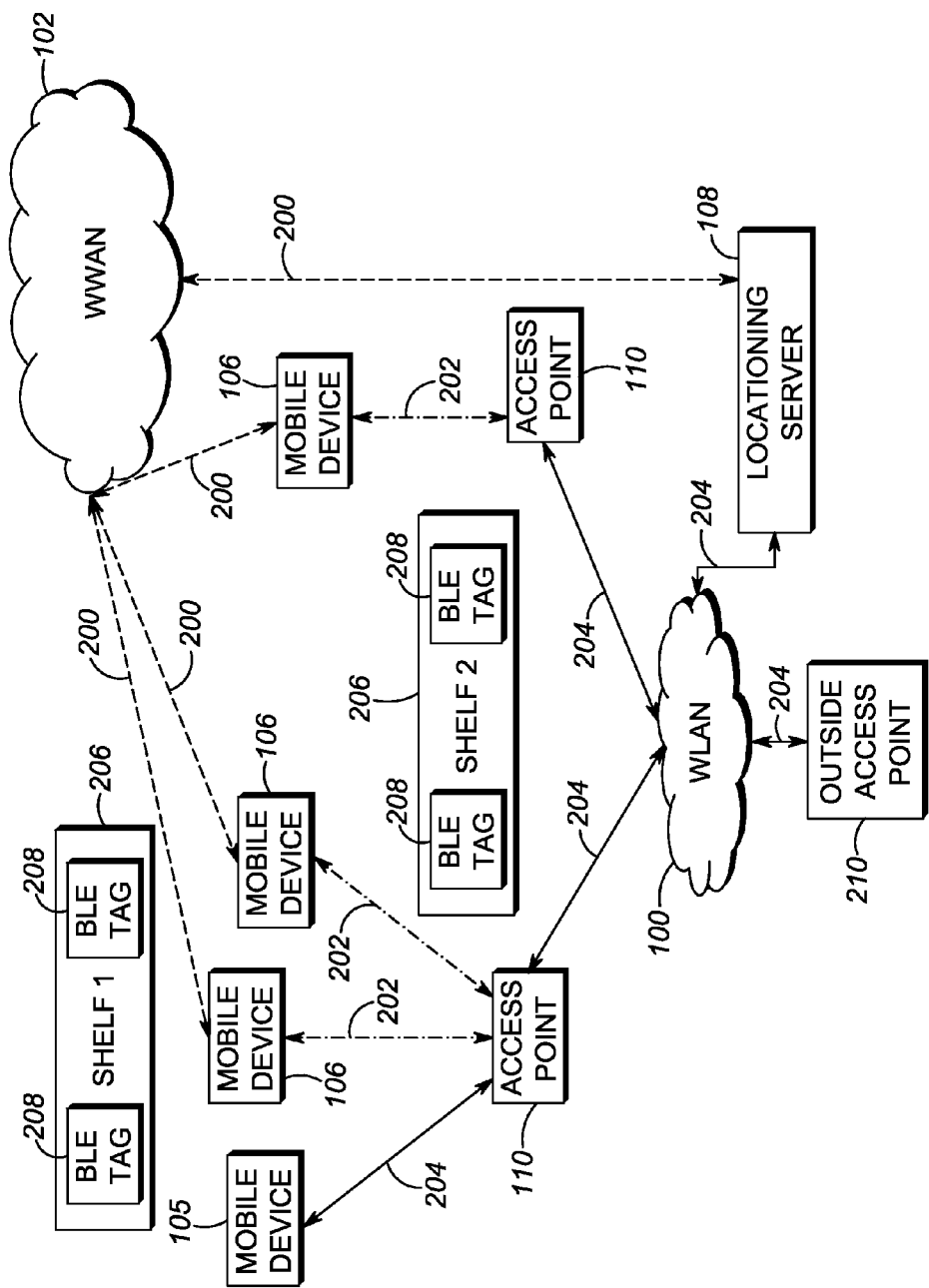
FIG. 2 is a simplified block diagram of implementation of the present invention specific to the locationing system, in accordance with some embodiments of the present invention.

In exemplary embodiments, such as shown in FIG. 1 and FIG. 2, the present invention utilizes radio frequency and associated protocols. In particular, the present invention provides a system with connectivity to a wireless local area network hereafter referred to as WLAN 100 and a wired or wireless wide area network hereafter referred to as WWAN 102. WLAN can be based on various protocols including but not limited to IEEE 802.11. WWAN can be based on various wired or wireless technologies such as cellular networks, Ethernet, etc. For example, the description that follows can apply to an access network that is IEEE 802.xx-based, employing wireless technologies such as RF, IrDA (infrared), Bluetooth, ZigBee (and other variants of the IEEE 802.15 protocol), IEEE 802.11 (any variation), IEEE 802.16 (WiMAX or any other variation), IEEE 802.20, Direct Sequence Spread Spectrum; Frequency Hopping Spread Spectrum; cellular/wireless/cordless telecommunication protocols not limited to GSM, CDMA, TDMA, GPRS, EDGE, LTE, UMTS, etc.; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB, any of which can be modified to implement the embodiments of the present invention.

Those skilled in the art will recognize that FIG. 1 and FIG. 2 do not depict all of the equipment necessary for system to operate but only those system components and logical entities particularly relevant to the description of embodiments herein. Each of the devices shown in the figures are known to also comprise basic interconnected components such as, but not limited to, radios, transceivers, antennas, keypads, speakers, microphones, displays, memories, interfaces and processors, such as microprocessors, microcontrollers, digital signal processors, application-specific integrated circuits, field programmable gate arrays, and/or logic circuitry. Such components are typically adapted to implement algorithms and/or protocols that have been expressed using high-level design languages or descriptions, expressed using computer instructions, expressed using messaging logic flow diagrams. Thus, given an algorithm, a logic flow, a messaging/signaling flow, and/or a protocol specification, those skilled in the art are aware of the many design and development techniques available to implement a processor that performs the given logic.

Therefore, each network entity and mobile device represents a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the present invention may be implemented in any of the devices listed above or distributed across such components. It is within the contemplation of the invention that the operating requirements of the present invention can be implemented in firmware or hardware, with the function being implemented in a software processor (or a digital signal processor) being merely a preferred option in conjunction with the firmware or hardware.

FIG. 1 represents a basic embodiment of a system architecture with connectivity to a wireless local area network (WLAN) 100 and a different, second communication network such as a wireless or wired wide area network (WWAN) 102, a metropolitan area network, Ethernet, etc. The networks 100, 102 are operable to provide communications between at least one mobile device 106 and a central server 108. However, the mobile device 104 not present in premises will not have access to WLAN. For the WLAN, communications between mobile devices and the central server is via one or more access point 110. For the second network, such as a WWAN, communications between mobile devices and the central server is via a base station (as is known in the art and not shown). In one embodiment, the central server can include a locationing function or location-based service. The networks can include other entities (not shown) as are known in the art to provide connectivity and communication services to multiple mobile devices.

In one embodiment, the WLAN system is operable within a retail store or shopping mall for example, and uses the WLAN to validate the physical presence of a (user and) client device operating within the confines of the premises. Usage of the present invention for validating physical presence is not limited to a locationing system. The present invention can be used with any system which needs to validate physical presence of a client. The present invention is applicable wherever two communication networks are available to a server, one of which is a WLAN providing coverage for only the confined premises, and the other of which is a second network (e.g. WWAN) providing a different coverage area than the WLAN, and wherein the client chooses to use the second network to communicate with the server. The second network is secure, but unlike the WLAN it is available in locations remote or different from the confines of the premises and thus it is incapable of validating that the client is physically present within the premises. FIG. 1 exemplifies such a scenario where a server can be accessed on two different media, the WLAN serving the confined premises and another secure second medium such as a cellular network. The requirement is that server provides communication access only when the client is present within the premises.

A client within the premises will have the option of having an application downloaded on their device (e.g. a smartphone). The application provides specialized services for the client and in exchange allows the store to use information about the client's activities within the mall or store. The application also provides modified communications with the server, in accordance with the present invention. Using the modified communications, the server will be able to validate the presence of the client device within the store, and thereby allow or deny the client device access to the server.

A client in the store may not be comfortable using a third-party store WLAN system for communication with the store server, and might prefer to use their own cellular service network (WWAN or second network) for this communication. The present invention is operable with this in mind. Therefore, referring back to FIG. 1, a client device 106 within the store may initiate communication with the server 108 using the downloaded application and using their device packet cellular service network (WWAN or second network). In accordance with the present invention, the application will generate a first key, n1, which is sent by the client device 106 in a first handshake message 1 over a secure connection of the cellular network to the server 108. In response the server will generate a second key, n2, which is sent in a second handshake message 2 over the cellular network back to the client device 106. The client device 106 then sends a WLAN probe request 3 that has been modified by the application to include the second key, n2, back to the server via the access point 110. The access point recognizes that WLAN probe is in the modified format and extracts the second key, n2, from the probe requests and sends 4 the second key, n2, to the server for validation. The server 108 responds to the access point 110 with an indication 5 that the validation was a success or a failure, and optionally provides feedback. The access point 110 generates a WLAN probe response 6 to the client device 106, where the probe response has been modified with the validation status of either success or failure, with optional feedback. If the client device application receives a probe response indicating a successful validation, the application is allowed communication access 7 to the server over the cellular network using messages that includes the pair {n1, n2}. However, if the client device application receives a probe response indicating a failed validation, either feedback is provided to the client device and/or the application is disallowed communication access to the server. A client device 104 that is not present within the store will not be able to communicate using the WLAN, and therefore will not be allowed to have access the server. Various other validation failure modes will be discussed below.

The solution of the present invention provides effective steps to limit server access only to those customers who are physically present in the WLAN area and deny access to those whose presence can't be validated. The present invention modifies inexpensive WLAN probe-requests and probe-responses to validate the physical presence of a customer carrying the client device in the confined area. The customer's device does not need to associate with the WLAN, which is leveraged to provide the validation. This approach takes care of privacy and security concerns of customers who are wary of connecting to a third-party WLAN and would prefer to connect using their cellular service provider or other network. Although the validation is foolproof, the computation overhead is negligible, which in turn reduces any battery drain of the customer's mobile device.

In a more specific embodiment, the present invention can be a locationing system where the application serves to collect mobile device location data for a locationing server. The locationing system aims to collect the location-data (coordinates) of customers in confined premises, e.g. a shopping mall. These location-data collected over a time period is used by various analytics engine to derive meaningful results for customer product interest. The correctness of the derived results lies is the integrity of the location data.

FIG. 2 shows a generalized locationing area, such as a store, that has shelves 206 carrying products. Radio frequency identification (RFID) or Bluetooth™ Low Energy (BLE) tags 208, as are used in this example, or other identification devices (e.g. computers that can respond to interrogation requests) are deployed in predefined positions next to products to be monitored by the locationing server 108 in accordance with a floor-map or planogram. A customer carries a mobile device 106 (e.g. smart-phone) which runs a downloaded locationing application for the store. The mobile device 106 is capable of communicating with the locationing server 108 over both a WLAN network 100 and second network such as a cellular network (WWAN) 102, using a secure connection for example HTTPS. In this example, mobile device 105 communicates only over WLAN. When the connection is carried over the WLAN infrastructure network in the premises, it is called locationing-over-WLAN. When the connection is carried over the cellular network, it is called locationing-over-cellular-network. As shown, there are several different communication messages exchanged in the present invention including cellular network links 200, WLAN links 204, and modified probe requests and probe responses links 202.

The client's mobile device 106 listens to the beacons or probe responses of one or more identification devices, such as optical or ultrasonic devices, BLE-tags 208, or an RFID tag if applicable. Each beacon carries unique identity information for each respective tag. Based on the received BLE signal strength, the mobile device can determine which BLE-tag is the closest, and records the identity of that tag. The mobile device can then send the identity information extracted from the relevant beacon, in a location update message (LUM) to the server, which is aware of the position of each identified BLE-tag based on the predefined floor-map of the tags on the premises. Based on the tag identity in the received LUM and the BLE-tag position on the floor map, the server can determine the customer's location data (coordinates in the premises) by association. It should also be noted that the floor-map can also include an association of the Basic Service Set Identifier of each access point (AP) 110 and the tags being serviced by that AP.

In operation, the identification devices periodically or otherwise transmit their information in beacons or probe responses. The information consists of attributes of the identification device, including but not limited to an identity and possibly a battery status, among other information. The identification devices are operable to transmit their message at a limited power level, but configured to cover all areas of the premises. In such a configuration, the transmit ranges of neighboring identification devices that can be received by the mobile device may overlap to some extent. In this way, a mobile device could receive a beacon from more than one identification device at one time, or more than one identification device at separate times within a limited time window, and report one or more of these beacons in one location update message. It is also envisioned that the identification devices are deployed such that a mobile device moving within the premises will always be able to receive a message from at least one identification device. For example, tags could successfully be deployed every six feet.

The message can be received by a mobile device in proximity to at least one of the identification devices, such as when a user of the mobile device walks in front of a tag. The mobile device can be a smartphone including a loyalty application installed therein. Then the mobile device can read the information in the beacon including the identity of the identification device, and report that information to the server in a location update message.

It is envisioned that within the premises that a fraudulent user can use a sniffer tool or other device to obtain legitimate tag identities. The fraudulent user can then introduce a malicious device to send incorrect location update messages, in order to distort client activities. The malicious device will be a legitimate client as far as protocols such as IEEE802.11, IEEE802.H, etc are concerned. As such, the malicious device will not violate any state or protocol. However, the malicious device can cause the server to receive incorrect information within the location update messages. Location update messages are genuine application level messages sent using appropriate packets conforming to protocols such as IEEE802.H. However, the information in them will be incorrect. For example, a malicious device could supply a false tag identity (and possible a spoofed MAC address) information in a legitimate location update message indicating a different location of a mobile client. In another example, a rogue mobile device can maliciously change correctly read tag information, or generate false information, which is placed in a legitimate location update message that is properly sent to the server. In either event, IEEE 802.11 rogue detection protocols cannot be applied in case of, since proper IEEE 802.11 protocols and packets standards are not being violated. The present invention provides a separate presence validation procedure, using a second communication network, in order to allow server access for only those clients that are confirmed as being located within the premises.

Figure 3A:
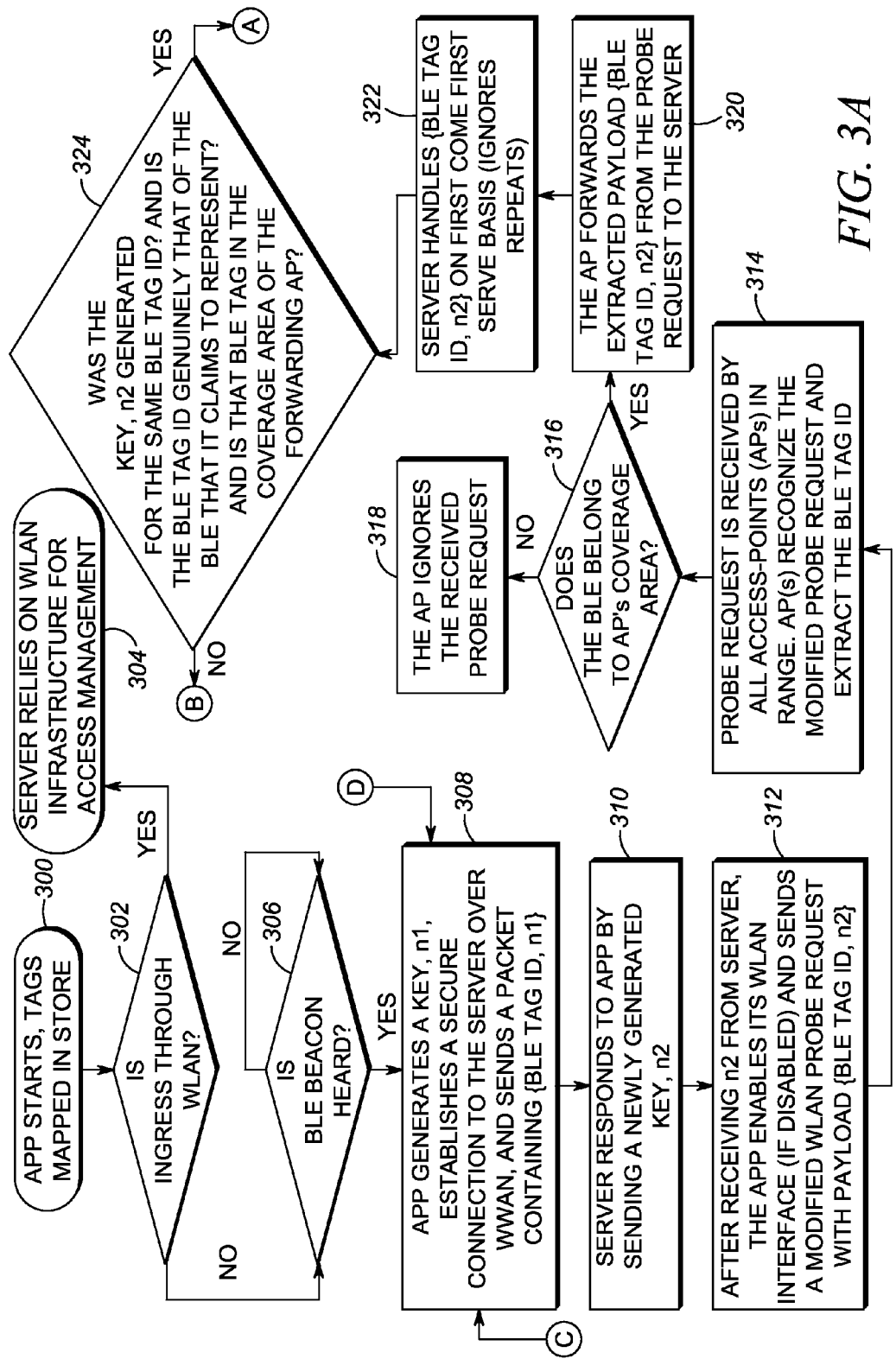
FIGS. 3A-3C represent three portions of a flow diagram of a method using the present invention in an implementation specific to the locationing system, in accordance with some embodiments of the present invention.
Figure 3B:
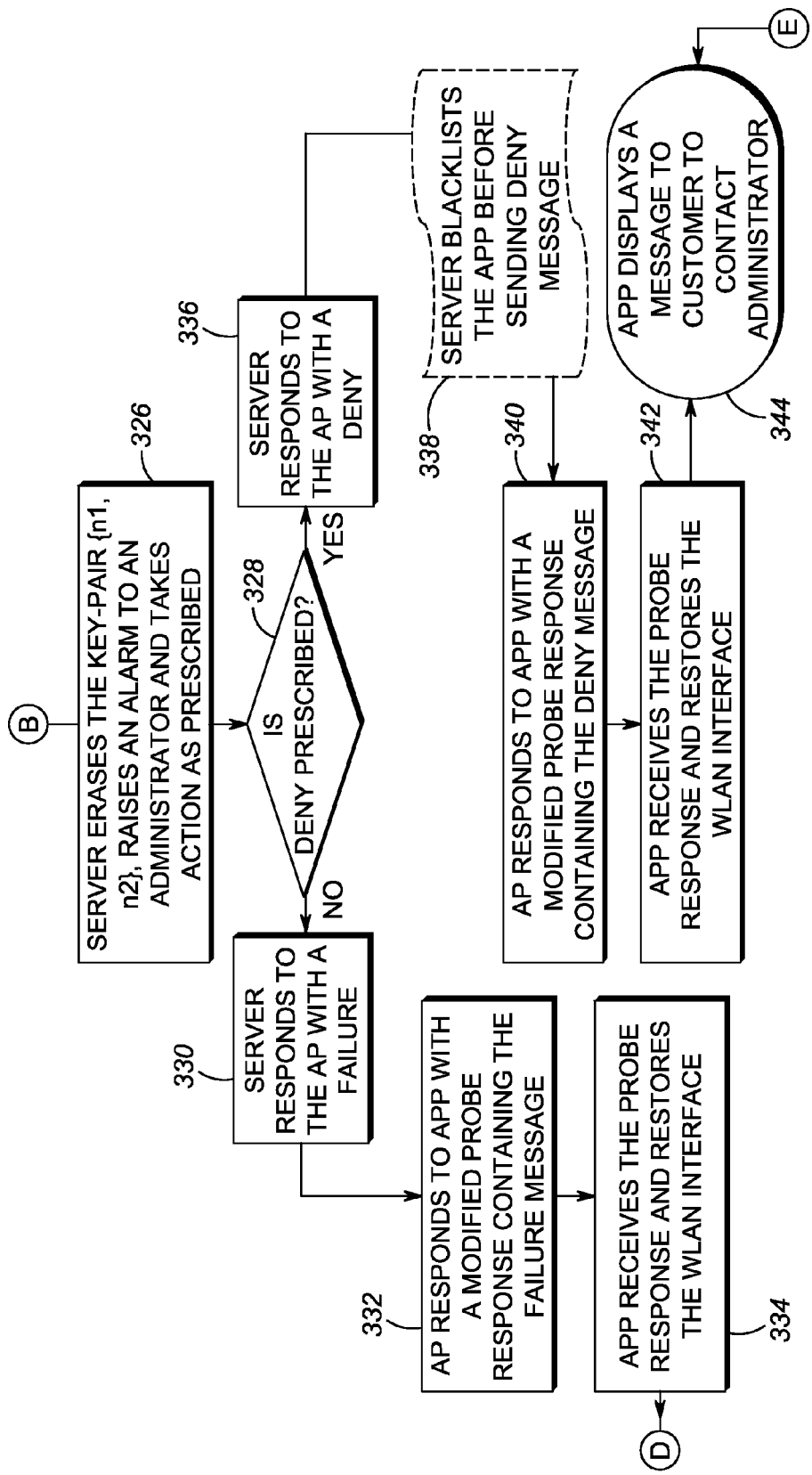
Figure 3C:
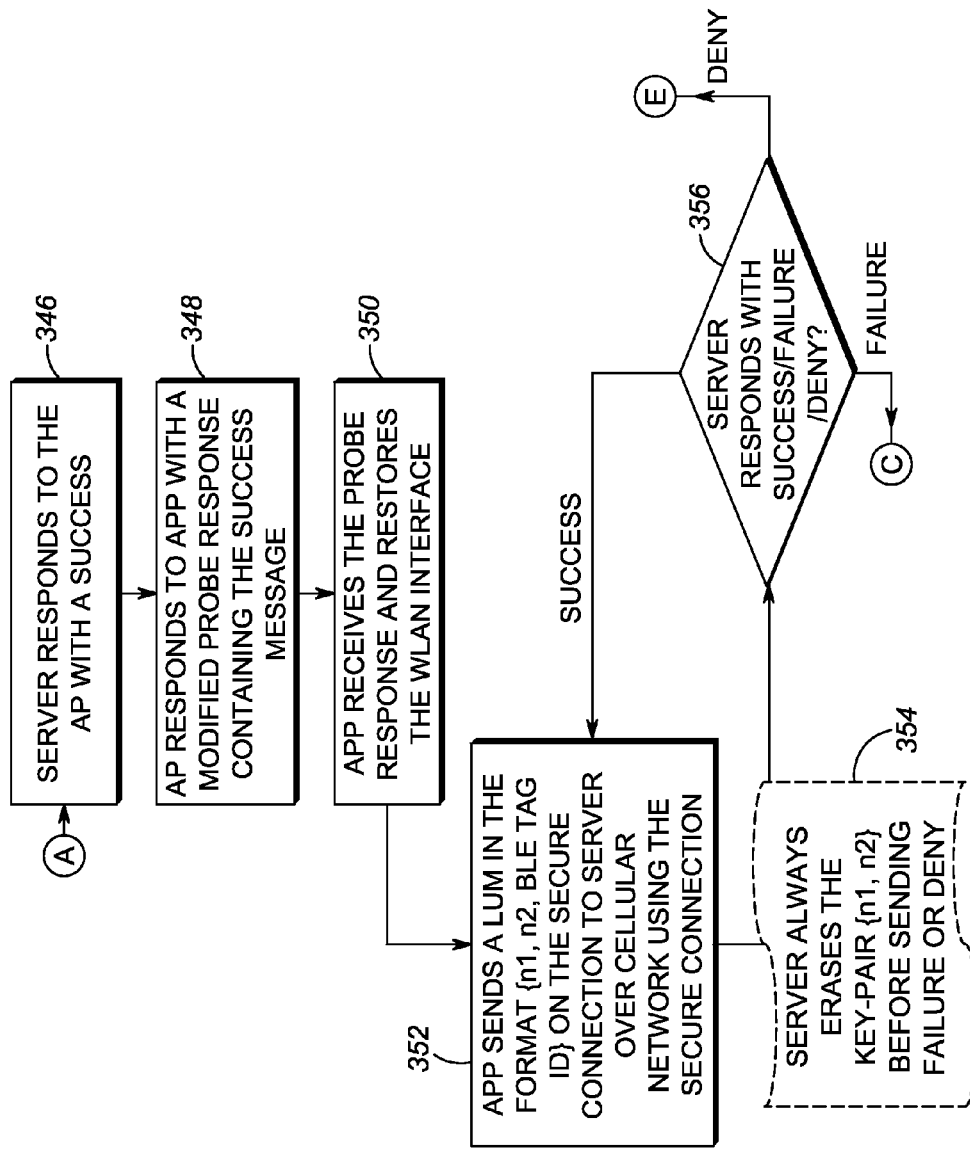

Referring to FIGS. 2 and 3, a confined area is defined, for example a retail store. The store has a plurality of identification devices, being radio frequency based tags 208 in this example, configured to be disposed at predefined mapped locations within the confined premises and operable to periodically broadcast or respond to interrogation requests with unique identity information, i.e. a BLE tag will broadcast a beacon containing its unique identity. A mobile device enters the premises, and an installed application, provided as a download by the retail store, is started 300, either manually by the user or automatically when detecting entry into the store.

When the application is started it checks 302 whether a connection to the locationing server 108 ingresses from the WLAN network 100 or the WWAN (second) network 102. If WLAN network is being used then it is obvious that the customer is physically present in the premises. In such a case, WLAN network can manage 304 the access rights of the user's mobile device instead of using the present invention. If the access is through the WWAN, the customer's physical presence in the facility needs to be validated, in accordance with the present invention. The application waits for the mobile device to read identity information broadcast from a first radio frequency tag 306 (e.g. BLE beacon) in proximity to the mobile device. When the application receives the first BLE beacon it initiates and establishes 308 a secure connection (e.g. HTTPS) to the server over the WWAN. The application generates a random key, n1, and sends it over WWAN link 200 to the server 108 over the WWAN along with the BLE beacon identity in a first handshake message in a predefined format, for example {BLE tag ID, n1}.

The server receives 310 the first handshake message and responds to the application, over the same connection, with a newly generated random key, n2, in a second handshake message. It should be noted that the key, n2, is unique. The key, n2 has an associated timeout, after the expiration of which it will be erased and the application would be required to reinitiate the key-exchange process. In other words, after the expiration time, the server will not accept any communication for the expired key and will request the device to reinitiate the presence validation process. The timeout could be configured to be the same as the average time customers stay in the premises. Apart from other application/device identifiers, the server will use the key-pair {n1, n2} to identify an application/device.

The application receives 312 the key, n2, in the second handshake message from the server. If WLAN interface on mobile device is disabled, the application enables its WLAN interface. (The application remembers the previous state of the WLAN interface and restores it after the WLAN probe request-response transaction is completed.) The application sends a modified WLAN probe request 202 with n2 and the BLE beacon identity in the header or payload in a specified format, for example {BLE tag ID, n2}, to a recipient WLAN access point (AP) 110. This WLAN probe request is of special format identifiable by the recipient WLAN AP.

This modified-format WLAN probe request is received 314 by all APs in the range of the mobile device. The AP(s) are configured to recognize that the probe request has been modified, and proceed to extract the BLE tag ID from the header or payload. Each AP maintains a location table which contains a map of the location of all BLE tag identities which are in the AP's coverage area. Some BLE tags can be under the coverage area of multiple APs due to overlapped coverage. Factors influencing coverage area are transmit power, AP model, etc. and a site-planning-tool will limit overlapping to two or three AP(s), which falls under the purview of site-planning.

Each AP can check 316 whether an identified BLE tag is under its coverage area. If the BLE tag ID represents a BLE tag under that AP's coverage area, then the AP forwards 204 the header or payload {BLE tag ID, n2} extracted from the probe request from the device to the server over the WLAN. Otherwise, the AP ignores 318 the probe request.

The server handles 322 the forwarded header or payload on a first-come, first-serve basis. However, it maintains the count of similar headers or payloads received towards heuristics so that can ignore repeated receipts of the same payload. This approach is necessary to handle the case where multiple APs forward the same header or payload due to overlapped coverage area.

The server evaluates 324 the header or payload against three criteria: a) was the key, n2, originally generated by server for the same BLE tag ID?, b) is the identified BLE-tag in the coverage area of the AP that forwarded the header or payload over the WLAN?, and c) is the BLE tag ID from the forwarded header or payload over the WLAN genuinely that of the BLE tag that it claims to represent? To evaluate this last criterion a heuristics approach is taken. For example, the server can compare battery status of the tag with last known battery status. Various heuristic methods can be applied. For example, battery status can only be lower or equal to the last known battery status of the same tag, of course with exceptions such as battery replacement. Further, heuristic methods are not limited to use of battery status alone since various heuristic methods can be applied to various other attributes of tag. For example, a number of retries can be determined, where a client can be blacklisted after a fixed number of retries are attempted.

If the criteria evaluation 324 finds any discrepancy, then the server erases 326 the key-pair {n1, n2} and sends an alarm to an administrator on a graphical user interface or display. The server further takes a prescribed action which leads to either a deny state if malicious intent is detected or a failure state if the problem is merely an unexpected behavior which may not be malicious. For example, if deny state is prescribed 328 the server blacklists 338 the mobile device/application, preventing it from any further interaction with the WLAN, responds 336 to the AP with a deny message, and the AP in turn sends a modified WLAN probe-response containing the deny message to the mobile device/application. The application receives 342 the probe response, restores the WLAN interface to previous state, and displays 344 a message to the customer requesting him to contact the premise's administrator. Alternatively, if a failure state is reached 328, the server responds 330 to the AP with a failure message, and the AP in turn sends 332 a modified WLAN probe-response containing the failure message to the mobile device/application, which receives 334 the probe response, restores the WLAN interface to previous state, and proceeds 308 with a retry as shown.

If the criteria evaluation carried out 324 by server was successful, the server responds 346 to the AP with a success message. The AP in turn sends 348 a modified WLAN probe-response containing success message to the mobile device/application, which receives 350 the success message and knows that the physical presence of the customer in the premises has been validated successfully. The application restores the WLAN interface to previous state, and can start sending 352 location update messages to LS 108 over the cellular network (WWAN) so that the server can track the location of the mobile device within the premises. The location update messages can be sent using the same secure wireless wide area network connection as the handshake messages or over a new connection. The location update messages contain the key-pair n1, n2 along with the BLE tag ID in a specified format, e.g. {n1, n2, BLE tag ID}.

To every location update message, the server responds 356 with either a success/failure/deny message. In both cases of the failure and deny states, the LS 108 erases 354 the key-pair {n1, n2} before sending the failure or deny message. The failure and deny state can be reached under several conditions depending upon heuristics and rules configured in the server. For instance, the failure state can occur when the key, n2, has timed-out, and a deny state can occur if the server receives a location update message when the premises are not open for customers. In short, the deny state usually results from suspected malicious behavior or violation of heuristic indicators that results in a display 344 of a message to the customer requesting him to contact the premise's administrator, whereas the fail state usually results from an unexpected behavior which can be given a retry 308 since it is yet to become suspect.

Referring back to FIG. 2, it may be that the WLAN radio signal 204 leaks out of the premises, or that there may be an access point 210 that is outside the premises. Under these circumstances, the present invention can be made more effective by certain site specific configurations and production specific conventions. The AP's ability to interpret modified probe-requests should be made a configuration item, and by convention outdoor APs should not have the ability to interpret the modified probe-requests. By configuration the locationing server or the site-planner should enable the ability to interpret the modified probe-requests in only those APs which have BLE-tags installed in their coverage area. This will limit the physical area from where a customer's physical presence can be validated.

The keys n1 and n2 can be generated using various different methods. For example, the keys can be generated using pseudo random number generators. By configuration, the bit-size of the key n2 should be large enough to accommodate the highest number of peak-customer visits by a significant margin. The key generation method for key, n1 should ensure that the generated key is never same as that generated by another client. This can be achieved by using various methods. For example, a client identifier (e.g. MAC address) is appended to a generated pseudo random number and encrypted by the mobile device to ensure that the key is not open to a security attack. Multiple keys can be generated for a particular client however a generated key can only belong to a particular client. This approach will ensure that the server can recognize when a key n1, spoofed by a different client, is being used by it to gain access. By convention, the bit-size of the key, n1 should be large enough to ensure that probability of a guess by a fraudulent user is near zero. The server erases the key-pair {n1, n2} whenever the key, n1 sent does not match or is not from the same mobile device. This limits the guess to a single attempt. The server informs its management system about such attempts, which raises an alarm when the number of attempts exceeds a configured threshold.

Multiple approaches can be employed in conjugation to secure valid usage of the identifier and key-pair {n1, n2, BLE tag ID}. For instance, based on a floor-map, the server would know the BLE-tags on the perimeter of the premises. However, few such tags would qualify for entry/exit to the premises. The site-planner should configure those BLE-tags on a perimeter of an entry/exit path as edge-BLE-tags. If an application does not send a location update message after exiting from an area of an edge BLE-tag, the server will erase the key-pair {n1, n2}. As well, if a location update message is not received from an application within a configured multiple of expected time intervals, the server will erase the key-pair {n1, n2}.

FIG. 3 presents a flow chart that illustrates a method for validating presence of a communication device using a wireless local area network (WLAN), according to an exemplary embodiment of the present invention. The illustrated method is used by the locationing system and can be used in other location based services with suitable modifications to the flow while using the present invention.

A first step 308 includes sending a first handshake message including a generated first key over a wireless wide area network (WWAN) connection by a mobile device to a server.

A next step 310 includes generating, by the server, a second key to be returned to the mobile device in a second handshake message over the same wireless wide area network connection in response to receiving the first handshake message.

A next step 312 includes sending a WLAN probe request that has been modified to include the second key back to the server via the WLAN.

A next step 324 includes validating whether the mobile device is present within the confined area by the server using a WLAN, whereafter taking an action by the serving in response to the validating step. This action can include one or more of providing feedback 332 to the device about a validation or invalidation, allowing 346, 348 communication access to the server over the WWAN using both the first and second keys if the mobile device is validated as being present within the confined area, and disallowing 340 communication access to the server over the WWAN if the mobile device is not validated as being present within the confined area.

Advantageously, the solution described herein provides an effective technique to limit server access only to those customers who are physically present in the premises and deny access to those whose presence cannot be validated. The solution utilizes inexpensive WLAN probe-requests/responses to validate physical presence of a customer carrying the mobile device in an area. The customer's mobile device doesn't need to associate with the WLAN, which is leveraged to provide the validation. This approach takes care of privacy and security concerns of the customer who may be wary of connecting to a third-party WLAN, and instead wishes to use a cellular network (WWAN). Although the validation uses a WLAN, the computation overhead is negligible and does not drain the battery of customer's mobile device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for validating presence of a device in a confined area using a wireless local area network (WLAN) operable in the confined area, the method comprising:
    sending, by the device to a server, a first handshake message including a first key generated by the device over a connection in a second network that is a wireless wide area network;
    generating, by the server, a random second key to be returned to the device in a second handshake message over the second network connection in response to receiving the first handshake message;
    sending a WLAN probe request that has been modified to include the second key back to the server via the WLAN; and
    validating whether the device is present within the confined area by the server by determining whether the second key generated by the server is the same as the second key returned to the server in the modified WLAN probe request by the device; whereafter
    taking an action by the server in response to the validating step.

2. The method of claim 1, wherein taking an action includes:
    allowing communication access to the server over the second network using both the first and second keys if the device is validated as being present within the confined area, and
    disallowing communication access to the server over the second network if the device is not validated as being present within the confined area.

3. A system for validating presence of a device in a confined area using a wireless local area network (WLAN) operable in the confined area, the system comprising:
    the device operable to send a first handshake message including a first key generated by the device over a connection in a second network that is a wireless wide area network; and
    a server operable to receive, from the device over the second network, the first handshake message, and in response generate a random second key to be returned to the device in a second handshake message over the second network connection, wherein
    the device is further operable to send a WLAN probe request that has been modified to include the second key back to the server via an access point of the WLAN, wherein
    the server further operable to validate whether the device is present within the confined area using the second key received from the access point by determining whether the second key generated by the server is the same as the second key returned to the server in the modified WLAN probe request by the device, and take an action in response to the validation of the device.

4. The system of claim 3, wherein
if the device is validated as being present within the confined area, the device is then allowed communication access to the server over the second network using both the first and second keys, and
if the device is not validated as being present within the confined area, the device is disallowed communication access to the server.

5. The system of claim 3, further comprising:
a plurality of identification devices configured to be disposed at mapped locations within the confined area and operable to periodically broadcast or respond to interrogation requests with unique identity information; and wherein
the device is further operable to read identity information from identification devices in proximity to the device and operable to include identity information in the first handshake message; and wherein
the server is further operable to receive identity information along with the second key in the modified probe request, validate whether the device is present within the confined area using the second key and the identity information, and deliver a WLAN probe response modified with a validation status back to the device via the access point.

6. The system of claim 5, wherein the server validates using a determination as to whether the second key, originally generated by the server for the same identity over the second network connection, is the same as the second key that was received from the device via the access point over the WLAN.

7. The system of claim 6, wherein the determination includes a further determination as to whether the identity received along with the second key from the device over the WLAN is genuinely that of the identification device that it claims to represent.

8. The system of claim 7, wherein the further determination uses a heuristics approach that determines a number of messaging retries by the device, wherein the number of retries must be less than a fixed number of retries.

9. The system of claim 7, wherein the further determination uses a heuristics approach to compare battery status of the identification device with last known battery status, wherein battery status can only be lower or equal to the last known battery status of the same identification device.

10. The system of claim 6, wherein the determination includes a further determination as to whether the identification device is in the coverage area of the access point.

11. The system of claim 3, wherein the second key has an expiration time, wherein the server will not accept any communication for the expired key and request the device to reinitiate presence validation.

12. The system of claim 5, wherein, upon validation, the device is allowed to send messages to the server over the second network, wherein the messages include the first and second keys and the identity of the identification device.

13. The system of claim 12, wherein the server respond to each message with either a success, failure, or deny message.

14. The system of claim 13, wherein the server erases the first and second keys when it sends a failure or deny message.

15. The system of claim 3, wherein the messaging over the second network uses a secure connection.

16. The system of claim 3, wherein a WLAN interface of the device, if it is disabled, is enabled to send the modified WLAN probe request and receive the modified WLAN probe response, and otherwise the WLAN interface is restored.

17. A system for validating presence of a device in a confined area using a wireless local area network (WLAN) operable in the confined area, the system comprising:
a plurality of identification tags configured to be disposed at mapped locations within the confined area and operable to periodically broadcast or respond to interrogation requests with unique identity information;
a device operable to read identity information broadcast from identification tags in proximity to the device and send a first handshake message including a first key generated by the device and a tag identity over a packet cellular network; and
a server operable to receive, from the device over the cellular network, the first handshake message, and in response generate a random second key to be returned to the device along with the tag identity in a second handshake message over the same cellular network connection, wherein
the device is further operable to send a WLAN probe request that has been modified to include the second key and the tag identity back to the server via an access point of the WLAN that forwards the second key and the tag identity to the server, wherein
the server further operable to validate whether the device is present within the confined area using the second key and the tag identity received from the access point by determining whether the second key generated by the server is the same as the second key returned to the server in the modified WLAN probe request by the device and whether the tag identity in the first handshake message and the tag identity from the WLAN probe request are the same, and deliver a WLAN probe response modified with a validation status back to the device via the access point; wherein
if the device is validated as being present within the confined area, the device is then allowed access to send location update messages to the server over the cellular network using the first and second keys and the tag identity, and
if the device is not validated as being present within the confined area, the device is disallowed communication access to send messages to the server.

* * * * *